Patented Apr. 7, 1936

2,036,574

UNITED STATES PATENT OFFICE 2,036,574

PLASTIC COMPOSITION OF MATTER

Salvatore Gattuso, Ozone Park, N. Y.

No Drawing. Application March 4, 1935,
Serial No. 9,240

6 Claims. (Cl. 106—33)

This invention relates to improvements in compositions of matter for use in molding and casting and has for one of its objects the provision of a composition of matter which is inexpensive and which will quickly solidify upon cooling.

My improved composition of matter is particularly well adapted for use in the manufacture of dolls' heads, dolls' bodies, legs, arms, etc. and for any other kind of toys, either hollow or solid, inasmuch as when cast or molded it provides a tough, not easily broken article, with a smooth glossy finish, characteristics very desirable in articles of the type just mentioned.

My improved composition of matter may also be employed in the manufacture of works of art, such as, statues, vases, urns, etc.

My improved composition of matter in its best form comprises paraffin wax, carnauba wax, rosin and sulphur. These ingredients mixed together and in molten condition are poured into a brass boiler which is at a temperature of not substantially less than 100° F. and thoroughly mixed. When the ingredients have been thoroughly fused and mixed, the solution is removed from the brass boiler in any desired manner such as by pouring or through heated pipe lines to a cooling tank.

After the mixture has cooled it may be poured into molds for the manufacture of any of the articles above referred to, where it is allowed to stand for two or three minutes until it sets.

In the manufacture of dolls' heads and the like it is desirable to employ a composition of matter which is unbreakable and which will provide a glossy surface. Two ingredients of my composition of matter are paraffin wax and rosin, the paraffin wax making the composition of matter gummy and tough or unbreakable, the rosin giving the composition of matter a glossy surface. These two ingredients may be used in equal quantities although I have found that by employing slightly more paraffin wax than rosin a better composition of matter is obtained.

The carnauba wax is employed for the purpose of increasing the resistance of my improved material to heat, so that articles made from my improved composition of matter will successfully withstand the heat of the sun, for instance, without melting or running.

The sulphur is employed for the purpose of petrifying or hardening the composition to provide the necessary strength and durability.

The following is an example of proportions of ingredients employed in the making of one pound of my improved composition of matter:

|  | Ounces |
|---|---|
| Paraffin wax | 8 |
| Rosin | 5½ |
| Sulphur | 1½ |
| Carnauba wax | 1 |

It is to be understood, however, as above described, that the proportions of ingredients may be varied without departing from the spirit and scope of my invention.

What I claim is:—

1. A composition of matter comprising by weight approximately 50 parts of paraffin wax, approximately 35 parts of rosin, approximately 10 parts of sulphur and a material capable of increasing the resistance of the composition of matter to heat.

2. A composition of matter comprising by weight approximately 50 parts of paraffin wax, approximately 35 parts of rosin, approximately 5 parts of carnauba wax and a material capable of petrifying or hardening a composition of matter.

3. A composition of matter comprising by weight approximately 50 parts of paraffin wax, approximately 10 parts of sulphur, approximately 5 parts of carnauba wax and a material capable of providing a glossy surface to the composition of matter.

4. A composition of matter comprising by weight approximately 35 parts of rosin, approximately 10 parts of sulphur, approximately 5 parts of carnauba wax and a material for making the composition of matter gummy, tough and unbreakable.

5. A composition of matter comprising by weight approximately 50 parts of paraffin wax, approximately 35 parts of rosin, approximately 10 parts of sulphur and approximately 5 parts of carnauba wax.

6. A composition of matter comprising paraffin wax, rosin, sulphur and carnauba wax in approximately the following proportions:

|  | Ounces |
|---|---|
| Paraffin wax | 8 |
| Rosin | 5½ |
| Sulphur | 1½ |
| Carnauba wax | 1 |

SALVATORE GATTUSO.